United States Patent [19]

Cassagnol

[11] Patent Number: 5,343,471
[45] Date of Patent: Aug. 30, 1994

[54] ADDRESS FILTER FOR A TRANSPARENT BRIDGE INTERCONNECTING LOCAL AREA NETWORKS

[75] Inventor: Robert Cassagnol, Silver Spring, Md.

[73] Assignee: Hughes Aircraft Company, Los Angeles, Calif.

[21] Appl. No.: 880,857

[22] Filed: May 11, 1992

[51] Int. Cl.⁵ .......................................... H04L 12/46
[52] U.S. Cl. ..................................... 370/85.13; 370/97
[58] Field of Search .................... 370/60, 85.13, 85.14, 370/94.3, 97, 61; 364/715.11, 724.01

[56] References Cited

U.S. PATENT DOCUMENTS

| | | | |
|---|---|---|---|
| 4,737,953 | 4/1988 | Koch et al. | 370/85.13 |
| 4,754,420 | 6/1988 | Jensen | 370/85.13 |
| 4,922,503 | 5/1990 | Leone | 370/85.13 |
| 5,136,580 | 8/1992 | Videlock et al. | 370/85.13 |
| 5,151,897 | 9/1992 | Suzuki | 370/85.14 |

OTHER PUBLICATIONS

"Putting Routing Tables in Silicon" by Tong-Bi Pei and Charles Zukowski, IEEE Network Magazine, Jan. 1992 pp. 42–50.

Wilnai and Amitai, Electronic Design, Apr. 26, 1990, pp. 75–78, 80, 88 and 90.

*Primary Examiner*—Benedict V. Safourek
*Attorney, Agent, or Firm*—William J. Streeter; Wanda K. Denson-Low

[57] ABSTRACT

An address filter for a transparent bridge interconnecting two local area networks (LANs) is disclosed. The address filter is capable of determining from an address contained in a frame issued on one network if it should be transferred to a second network. The address is verified by determining a most likely address from a search tree. The search tree has a path which is defined by pairs of address bits. At the end of each path within the search tree defined by the address bit pairs is a term node. The term node identifies a location within a compare table which contains the most likely address matching the frame address. The two addresses are compared to make a copy decision. Node addresses which are added to a network can be learned by the filter. The search tree and compare table are reconfigurable by a host processor to accommodate learned addresses.

10 Claims, 8 Drawing Sheets

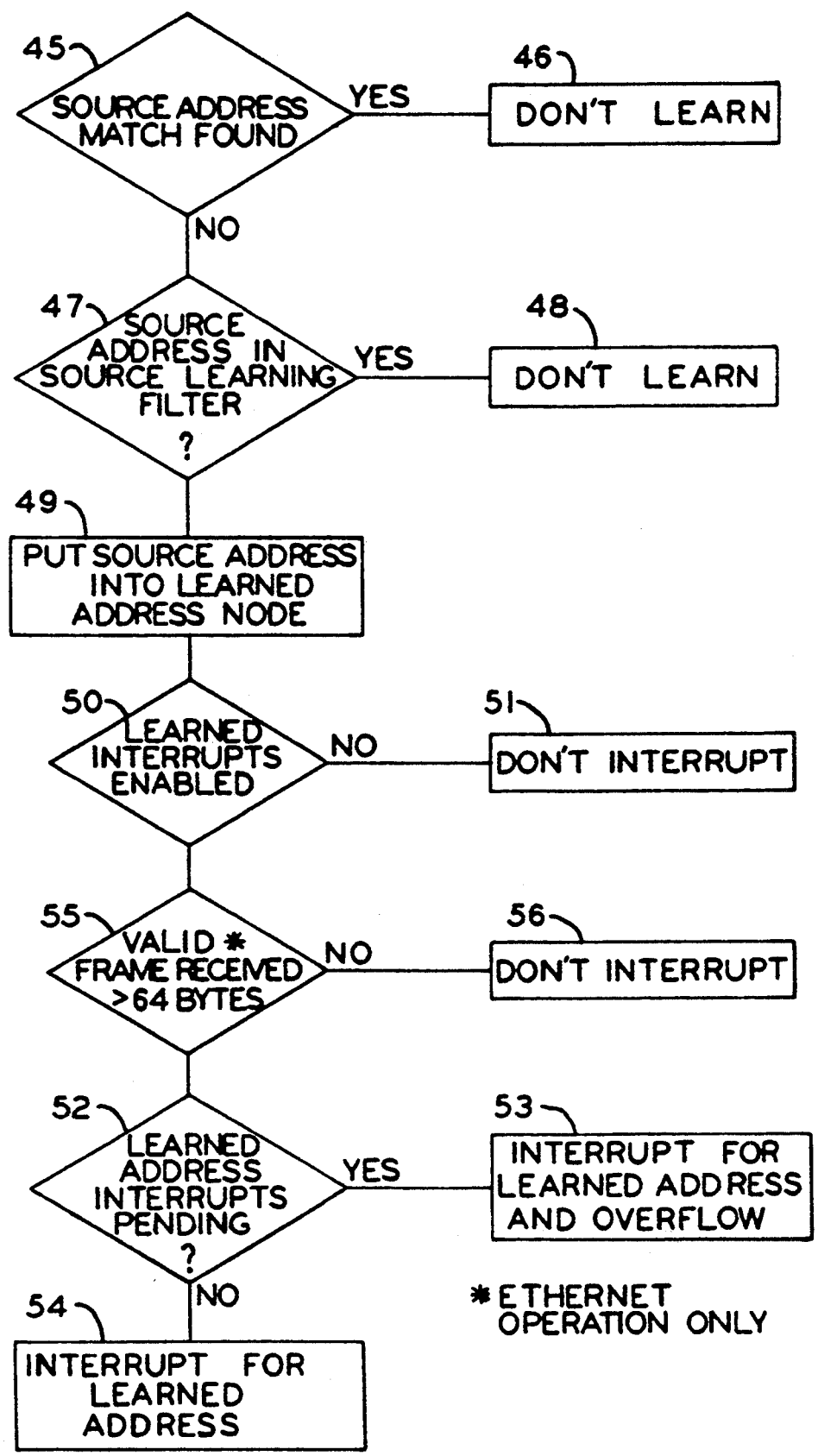
FIG_4

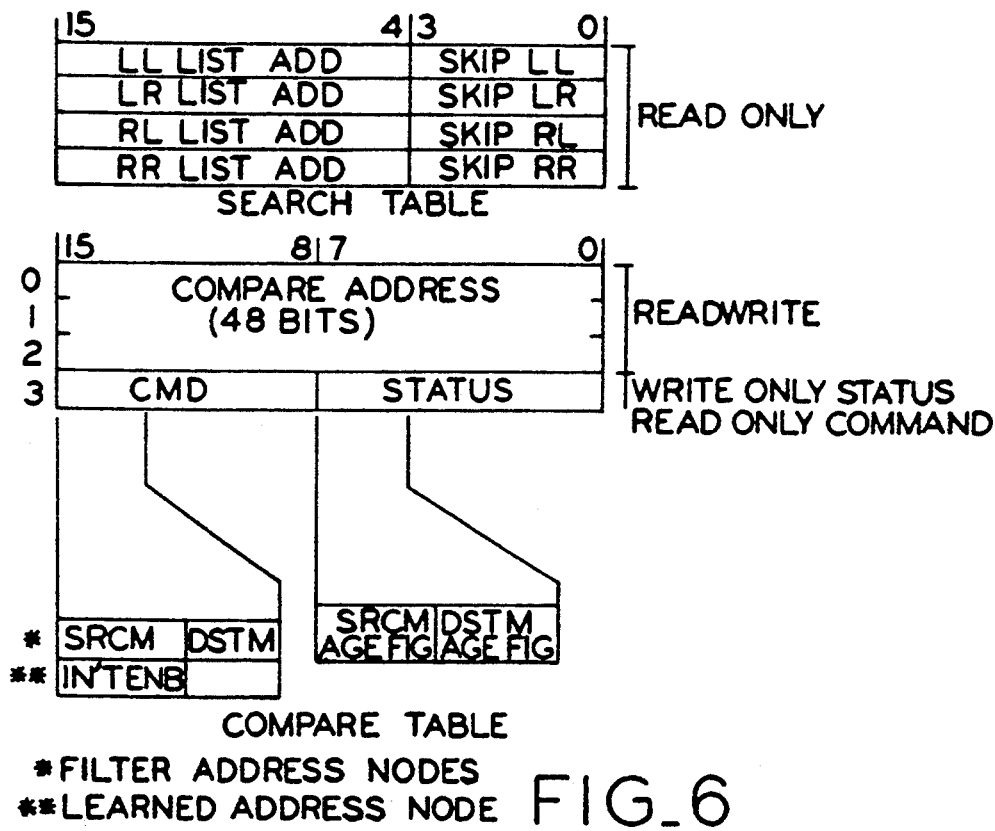
FIG_6
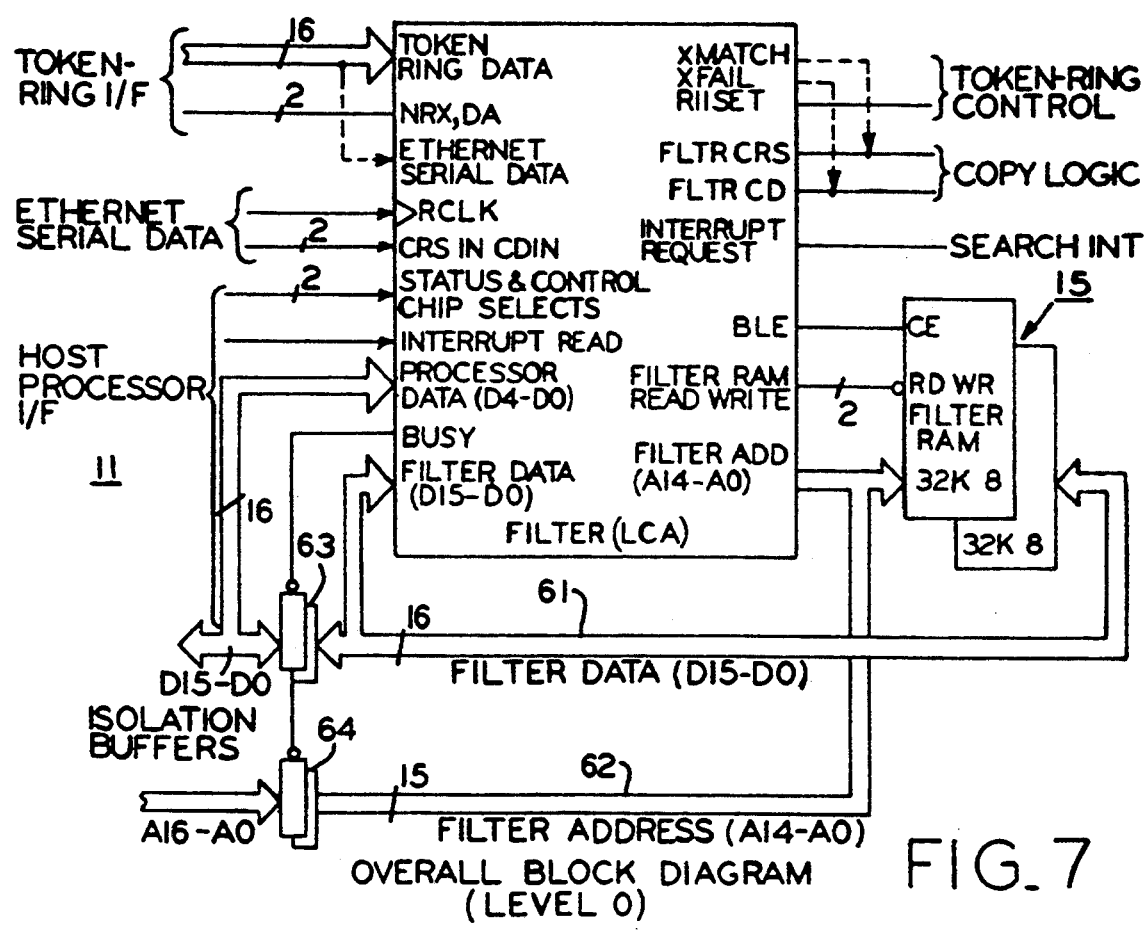
OVERALL BLOCK DIAGRAM
(LEVEL 0)
FIG_7

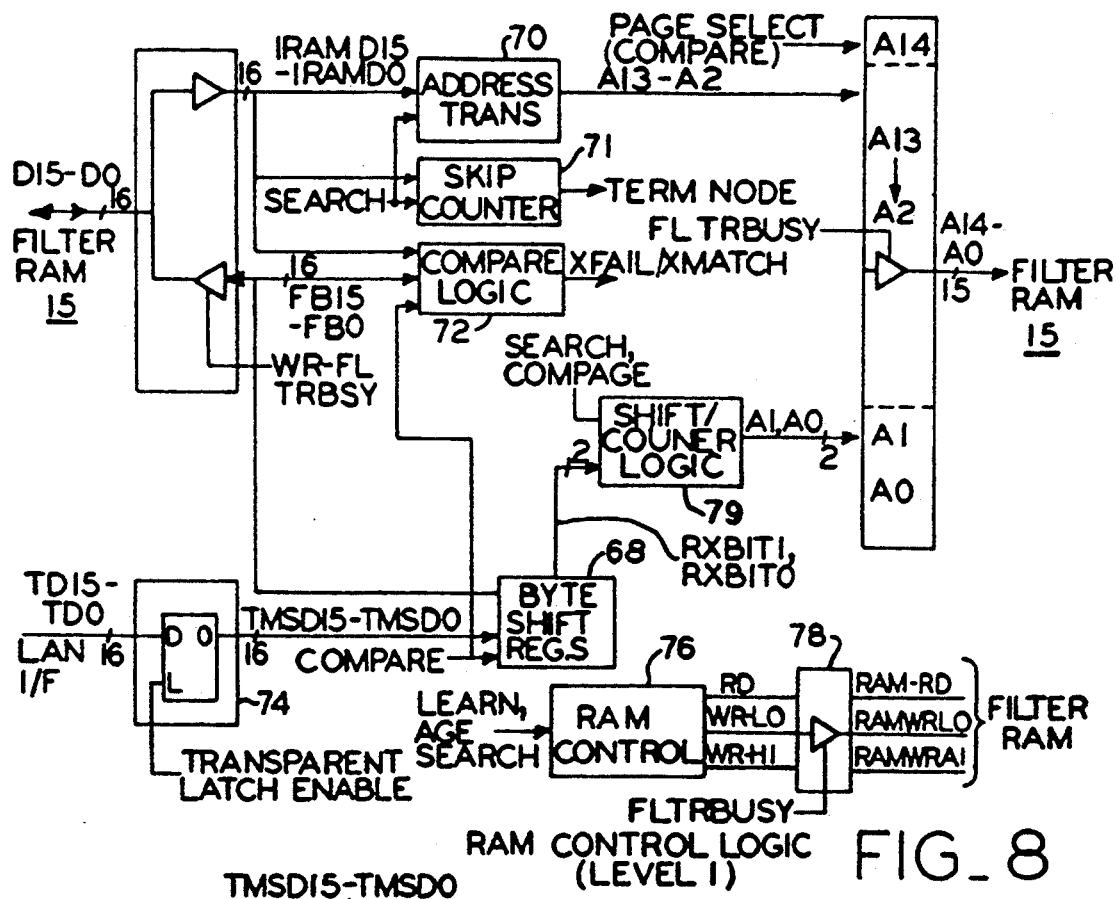
FIG_8
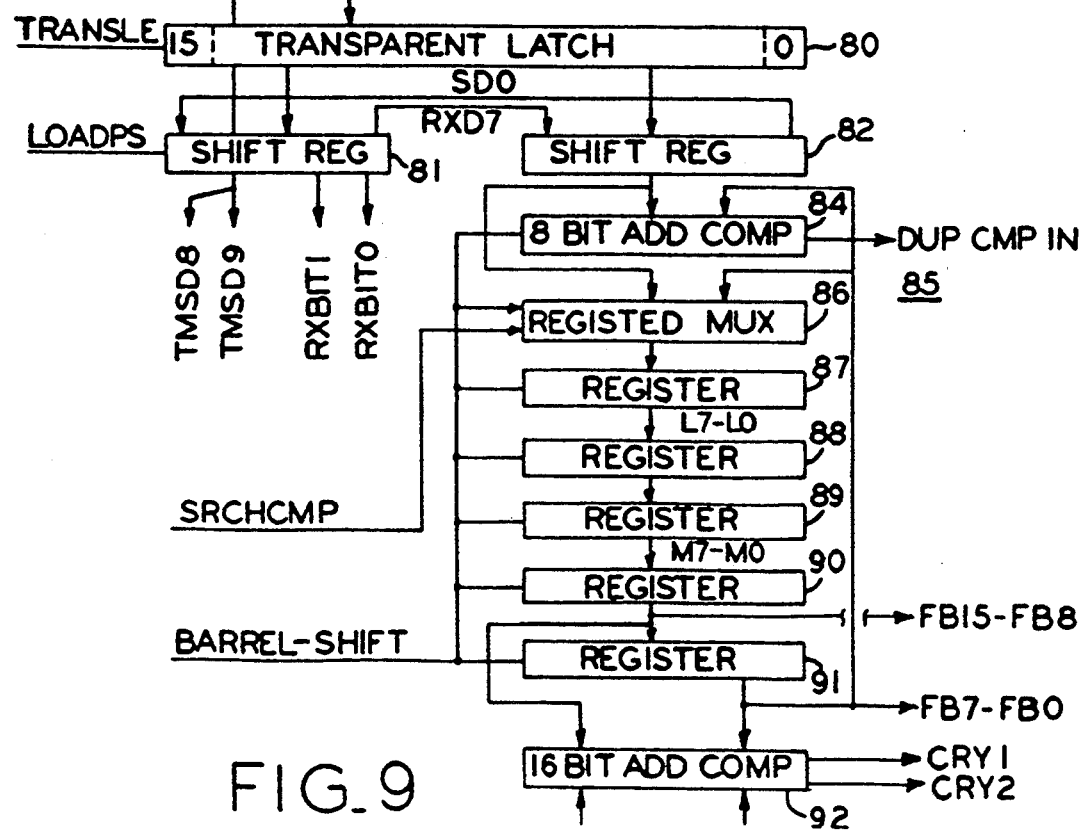
FIG_9

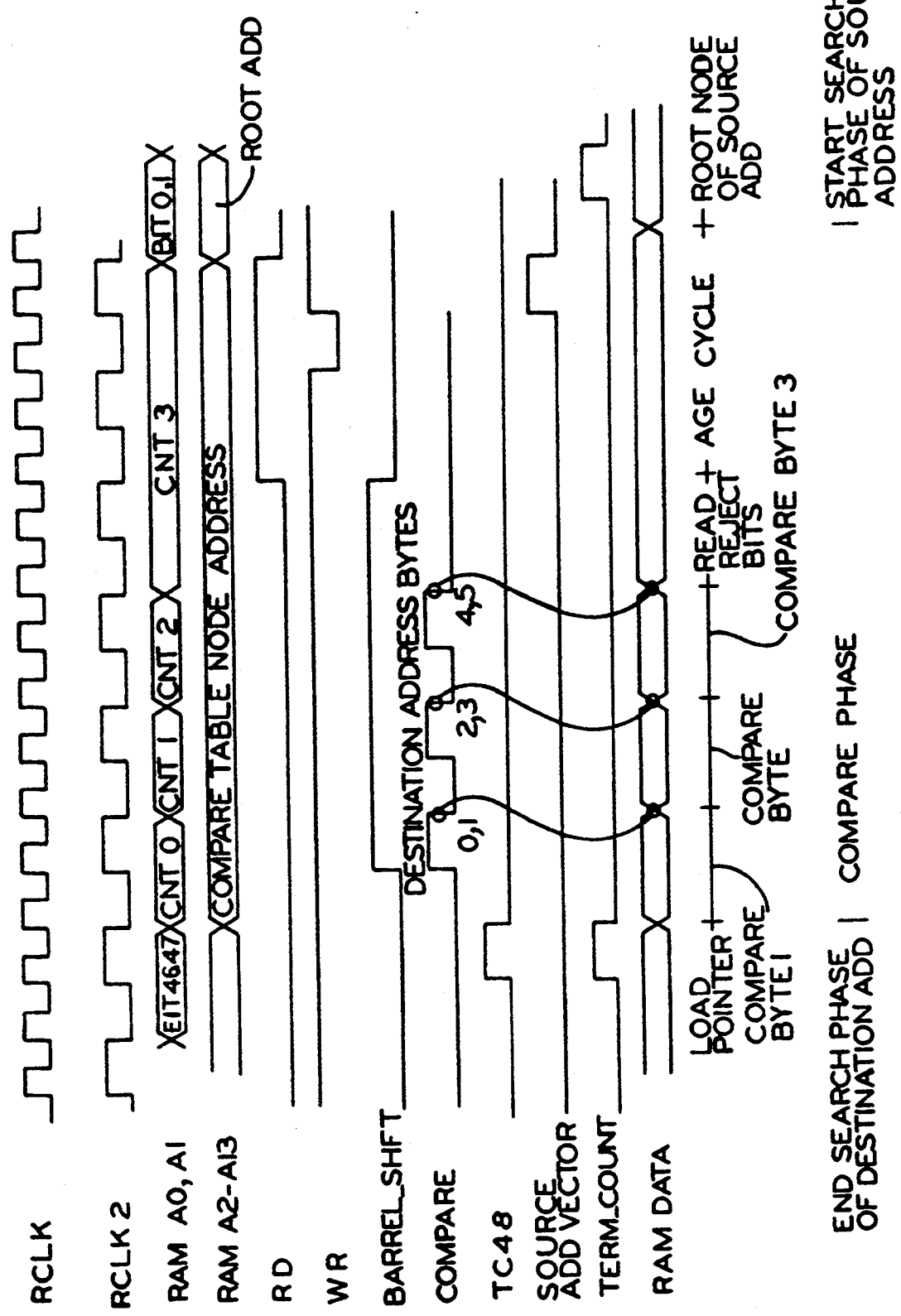
FIG_11

ADDRESS FILTER FOR A TRANSPARENT BRIDGE INTERCONNECTING LOCAL AREA NETWORKS

The present invention relates to bridges which are used to connect local area networks together. Specifically, an address filter is provided to screen data frames from being transferred from one local area network to another.

Local area networks provide a mechanism for transferring information among the entities or nodes of the network. Typically, information is transferred in the form of frames, where the makeup of a frame is dictated by the particular form of local area network. In addition to the data to be transferred, the frame includes various groups of bits, wherein each group performs a different function. One group may signal the beginning of the frame, another group signals the end of the frame, another group indicates the address of the transmitting node (source address), and another group indicates the address of the node to which the frame is being sent (destination address). A bridge is an entity which is located on two or more different local area networks and has the function of transferring frames from one local area network to another. A transparent bridge is a bridge which does not require the transmitting node to specially signal the fact that the bridge must transfer the frame from the local area network on which the frame is received to another local area network, e.g., where the addressed node is located on the other local area network and not on the same local area network as the transmitting node. A transparent bridge allows the transmitting node to act as if the destination node is located on a common local area network, even though the destination node is not located on a local area network in common with the transmitting node. A bridge may perform its function by simply copying all frames received from a first local area network and propagating each copy on the second. This protocol will insure that all frames received on the first network and addressed to a node on the second network will reach the intended destination. However, the protocol has the disadvantage that the second network will also receive all frames from the first network, even frames destined for nodes on the first network. It should be clear that it would be preferable to copy only frames actually destined for nodes on the second network. This selection is carried out by a filter which is part of the bridge. The filter has the function of determining from the source and destination addresses of the frame whether or not the frame should be copied from the network on which it is received and propagated onto another network.

Two considerations make the operation of a filter difficult to implement. First, the complement of nodes on both networks is dynamic; some nodes are active at a first time and other nodes are active at a later time. As a consequence, the list of node addresses on both networks is dynamic, and the filter must be capable of adapting to the changes in node complements of both networks. Secondly, the filter must act in the time frame of the network transmission. In other words, the filter must decide whether copying is required at the same rate as the rate at which frames are received.

The invention provides for the checking of addresses on data frames which originate on one local area network to determine whether they are to be copied to a second local area network. Bridges which employ address filters to check the destination address of a frame of data originating on one local area network before transferring it to the second local area network are known. In an article by Dan Wilmai and Zwie Amitai entitled "Speed LAN-Address Filtering with CAMs" *Electronic Design*, Apr. 26, 1990, beginning at page 75 content addressable memory chips are utilized as an address filter in a bridge application. In this application, the entire 48 bit destination address contained in a frame of data in a local area network using the Ethernet protocol is compared against a network address table which lists all the network nodes on the second local area network. When a matching address is found, the data packet is transferred to the other side of the bridge and copied to the second local area network.

These address filters employ software algorithms to quickly search through the network addressable table. As the frame rates and data rates of local area networks continually increase, the bridge controller must make a match decision in approximately a 100 nanosecond time frame, or performance will be degraded, slowing down the total traffic flow due to bottlenecks going from one local area network to another.

The above-referenced Electronic Design article describes a type of filter which is based on content addressable memories (CAMs). The content addressable memories permit a comparison of the routing address contained in a frame of data to a set of stored addresses. The CAMs operate by successive content translations. As the number of addresses which must be checked increases, the internal CAM structure increases, which disadvantageously increases the cost of such filters.

New local area networks operate at even faster rates, upwards of 100 MHz. The frame must be accepted or rejected based on the presence of specific address values. In order to avoid the buffering of frames during the process of deciding whether to copy the frame to the second local area network, extremely fast search procedures must be employed.

This decision-making process, along with the increased traffic demands of local area networks, severely limits the ability of current bridge systems to perform the other necessary protocol tasks. Thus, these high speed LAN applications may require a separate processor for the decision-making process, resulting in additional hardware overhead to complete the remaining protocol tasks.

These bridges should also have a learning capability. When new nodes are added to a network, it is necessary to readily update the address filter such that subsequent frames bearing these new addresses will be appropriately filtered. The learning capability must be readily configurable with software.

SUMMARY OF THE INVENTION

It is an object of this invention to provide an address filter and additional services for a transparent bridge interconnecting two local area networks.

It is a specific object of this invention to provide real time address filtering of data frames originating on one local area network before transferring them to a second local area network.

It is a more specific object of this invention to provide for both destination and source address filtering of an LAN data frame in a predetermined time.

It is a more specific object of this invention to provide for filtering of addresses in a data frame using a single key comparison, thus reducing computational overhead.

It is yet a further object of this invention to provide for learning capability to learn new addresses and update the filter with newly-learned addresses.

In the discussion that follows, the invention will operate from the assumption that only frames not destined for a node on the same local area network as the originating source node are to be copied to a second local area network. A compare table is provided of known source addresses which occur on the first local are network. Frames having a destination address matching an address in the compare table are not copied to the second local area network.

The invention determines whether a processed address is in the compare table through the use of a search tree. The search tree is traversed using only predetermined significant bits of the address. Significant bits of the address are those which will eliminate all but one of the compare table entries as possibly matching the received address. The one compare table entry is then compared to the complete 48 bit address being processed. Only a single key comparison is needed with this one entry to decide whether the address is in the table.

In the preferred embodiment, the search tree logic and compare table are implemented in the random access memory as a plurality of linked search nodes. The search nodes themselves comprise a subset of four memory locations, each of which includes a distinct multibit entry comprising a pointer and skip count. The pointers point to either another search node or to a compare table location containing a 48 bit address. The skip counts identify a subsequent pair of bits of the frame address for selecting an entry in a subsequent search node identified by a previously identified pointer.

In accordance with the preferred embodiment, the search address filtering begins when a main state machine of the programmable logic device indicates that a controller connected to a first local area network is receiving a data frame. Under clocking from the controller, the start of the frame signal is timed to indicate when the beginning of an address field occurs.

A root search node is a reserved node vectored at the start of an address search process. The first two bits of an address are used to select one of four entries in a root search node.

The selected entry contains a pointer, pointing to the next search node, and a skip count to indicate the next pair of frame address bits which are to be used to select an entry in the next search node. In this way, only significant address bits are examined to distinguish the entire 48 bit address from a table of addresses. The significant address bits are checked by traversing the linked search nodes in order to limit the possible table entries which match the address being processed to one table entry.

The search node traversal is terminated when a node contains a zero skip count indicating no further pairs of bits need to be checked as all but one address has been eliminated. Since all but one possible address has been eliminated, a single compare may be made between the remaining possible address and the entire received frame address. The pointer associated with the zero skip count points to the address location in a compare table containing the most likely address, which matches the frame address being processed. The memory location in the compare table is thus read and compared to the entire address being received to make the decision as to whether or not the most likely address matches the address being processed.

In a preferred embodiment of the invention, the table of addresses contains a list of addresses which belong to a local area network from which frames are to be copied to a second local area network. In this way, a no match determination indicates that the frame is destined for a node which exists on another LAN, and a copy decision made on this basis.

A source address for the frame may also be used in the determination as to whether or not the same is to be copied to a second LAN. It is possible with multiple filters connected to the first local area network to load-share, i.e., some filters will process frames having certain source address, while another filter may process frames having yet another series of source addresses.

As yet another improvement offered by the preferred embodiment, it is possible to have a control field associated with each address in the compare table. The control field may include a bit position for storing an aging bit which is set each time a particular address has been located in the compare table during address processing. The aging bit is set every time an address table entry has been found to correspond to a frame address being processed. In the case of destination address processing, a separate control field includes a bit position to indicate aging. A second control field includes a bit to indicate whether or not a source address which was processed was found to match a compare table entry. Over time these bits can be inventoried to determine inactive stagnant entries in the compare table which may be advantageously purged to make room for more active or later addresses.

In accordance with the preferred embodiment of the invention, this system provides for the learning of addresses which are not found to be in the compare tables of LAN addresses. Following the failure of the filter to find the source address in the compare table, a source learning filter will compare the address with a second, smaller table of known addresses which do not belong to the second local area network. The prohibited list of addresses is useful in avoiding the copying of frames which were transferred from the second local area network to the first local area network. As is known in token ring architecture, when the controller places a frame onto its local area network, the controller receives back the same frame. A frame which originates from the second local area network and is copied to the first local area network, may be seen by the filter as being associated with the first local area network upon its return to the controller. In order to avoid learning the source address contained in such frames, which originate from the second local area network, the prohibited list of filter addresses is provided. Thus, the first local area network filter will not learn the frame source address as a new address to be learned, since it is not associated with the first local area network.

If the new source address is not among this second table of addresses, the address is stored in a vectored location in RAM. An interrupt is posted to the host processor, indicating that this source address should be learned. The host processor will then compute the appropriate modifications to the search tree logic and compare table and modify the newly-computed search tree logic and compare table addresses.

In this way, newly-commissioned sources on the local area network are rapidly added to the filter data base.

Summarizing, the bridge of the preferred embodiment implements a filter for comparing selected bits of the frame destination address to the contents of a compare table in order to rapidly determine the most likely compare table entry which matches the address. The compare table is constructed and maintained based on the source addresses of the first LAN. After the selected address bit comparisons, there is one comparison of the full 48 bit frame destination address with the most likely address of the compare table. If a frame destination address matches a source address of the first LAN, as reflected in the compare table, then the frame will not be copied to another LAN.

In order to speed the comparisons, the bridge may load share the comparison operations with more than one filter, where the load sharing is keyed on the source addresses of the frames.

A prohibited table is made up of destination addresses of frames alrady copied from another LAN to the first LAN. If the compare table comparison results in a decision to copy, a further comparison is implemented based on the prohibited table, an equal comparison inhibits a copy operation. In this way, frames copied from the other LAN to the first LAN will not be copied back to the other LAN.

Once a decision to copy is made, a comparison of the frame's source address to the contents of the compare table is also made. If the frame's source address is found in the compare table then operation is complete. However, if the frame's source address is not found in the compare table, then the new source's address is "learned", i.e., it is added to the compare table.

DESCRIPTION OF THE FIGURES

FIG. 4 illustrates the learning feature for the filter to identify new source addresses from nodes logging onto a local area network for the first time.

FIG. 6 is an illustration showing how the random access memory 11, 12 is partitioned into a compare node and search node.

FIG. 7 is a block diagram illustrating the programmable logic device implementing the filter in accordance with a preferred embodiment of the invention.

FIG. 8 illustrates the RAM control logic provided by the filter for accessing the filter RAM during address verification.

FIG. 9 illustrates the byte shift registers of FIG. 8 for storing and buffering the addresses which are being filtered.

FIG. 11 illustrates the operation of the shift registers of FIG. 9 during a compare phase.

DESCRIPTION OF THE PREFERRED EMBODIMENT

Figure 1:
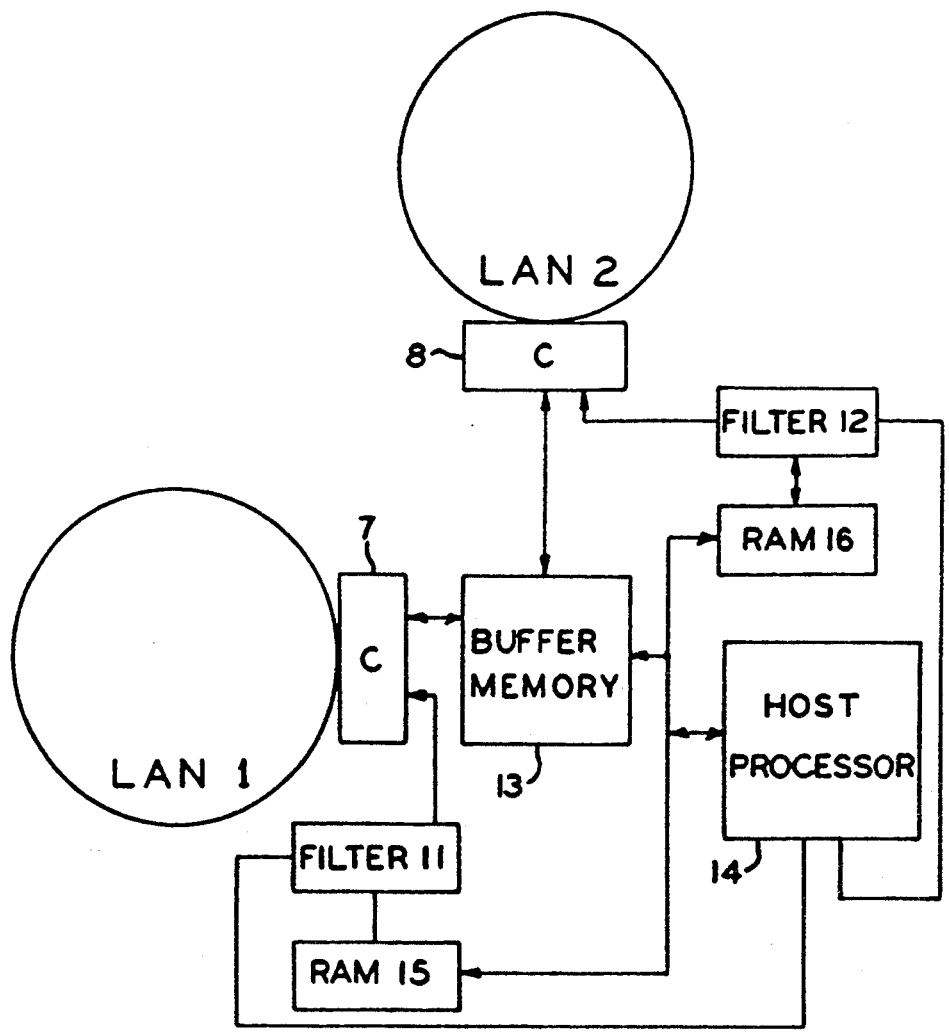
FIG. 1 illustrates a bridge structure for connecting two token ring local area networks.

Referring now to FIG. 1, there is shown two token ring local area networks (LANs) connected together via a bridge. The bridge is connected to controllers 7 and 8 of each of the LANs. The controllers 7, 8 are effectively nodes on the token ring structures which accept a frame being transmitted over the LANs. As will be evident, the token ring structure is only exemplary of LAN protocols that can be connected to a bridge.

A buffer memory 13 copies frames of data which are forwarded from each of the controllers 7 and 8 and are transferred to the opposite LAN. The bridge appears transparent in that network nodes of the first LAN freely communicate with the nodes of the second LAN via the bridge. Each LAN operates as though the nodes of the other LAN are actually its own.

Filters 11 and 12 associated with each of the controllers 7 and 8 determines whether or not a frame is to be transferred between LANs. Filters 11 and 12 are necessary in that copying every frame from one LAN to the other would increase the traffic and denigrate the LAN performance by having frames added to an LAN which do not address any node on the LAN. A host processor 14 will accept or reject frames based on a decision from a respective filter 11 and 12. The filter 11, 12 will signal to the controller 7, respectively, that the frame is not to be transferred when the address filter 11 or 12 indicates that the distinctive destination addresses in the frame were local addresses on the first (source) LAN.

The present invention employs a filter 11 which includes a search and compare algorithm stored in a respective RAM 15 and 16. The RAM 15 and 16 may be accessed by the host processor 14 which will update the RAM such that new addresses of learned sources signing on to each of the LANs are filtered in the future. Both the filter and the host processor can access the RAM 15, 16 over the respective buses.

Figure 2:
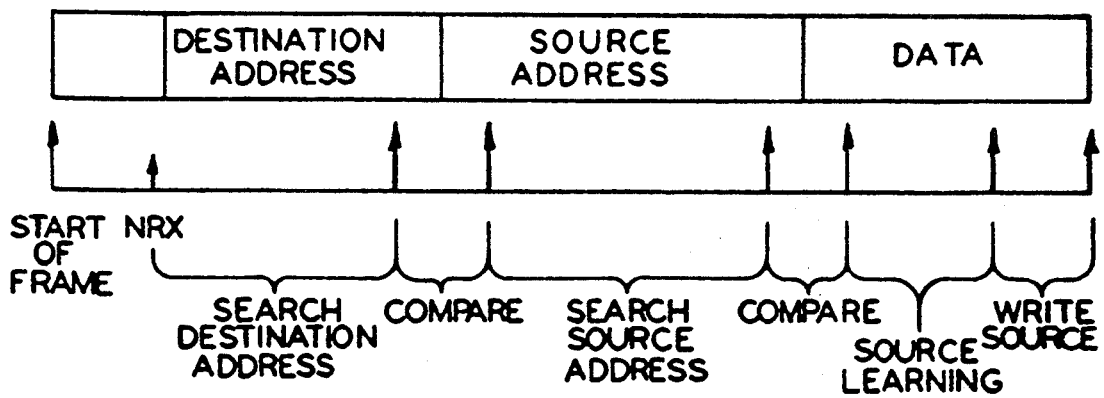
FIG. 2 illustrates the sequence of operations for an address filter which processes data received over a token ring in accordance with the IEEE standard.

FIG. 2 illustrates a token ring frame which includes at the beginning a start of frame signal, NRX, as well as control bits serving as a frame description. Following the control bits are 48 bits of destination address which are in turn followed by 48 bits of source address. The destination address represents the address of the node for which the frame is destined. The source address also has 48 bits which identify the originating node sending the frame.

The filter performs various functions while receiving the frame being transmitted on the LAN. As shown in FIG. 2, the start of frame signal NRX will be recognized by the filter. The destination address is checked and a decision is made as to whether or not the destination address is on the LAN which originates the frame. The process for checking an address includes a first portion for traversing a search tree to find the most likely address from a table of addresses known to be on the originating LAN. The second portion is a compare portion wherein the total 48 bits of the receive frame destination address are compared with the located most likely address. The same occurs in processing the source address. The address bits first traverse a search tree, and the most likely source address is found in the table of addresses. This located address is then compared to the actual 48 bit received source address.

Depending on the result of these checks, an ACCEPT (copies are used interchangeably) is issued to the controller of the first LAN to forward the frame to the buffer memory 13. As a result of the ACCEPT decision, the first LAN controller and host processor will then enter a handshake routine to prepare for the transfer of the frame to the second LAN.

Both addresses are verified within 6 bit times following the last bit of the source address received from the controller. Thus, the logic avoids the necessity to buffer the frames so that these decisions can be made.

When a source address of the frame is not found in the table of likely addresses, the filter enters a source learning phase. The source learning phase will compare the address against another table of addresses which are known not to identify devices on the first LAN. If this address is not found in the second table, the address to be learned is written to a vectored location in the RAM 11, where it is available for the host processor to read. An interrupt is posted to the host processor 14 informing the processor that an address has been loaded to the vectored location. The host processor will modify the search tree and compare tables to include the newly-learned address.

Figure 3:
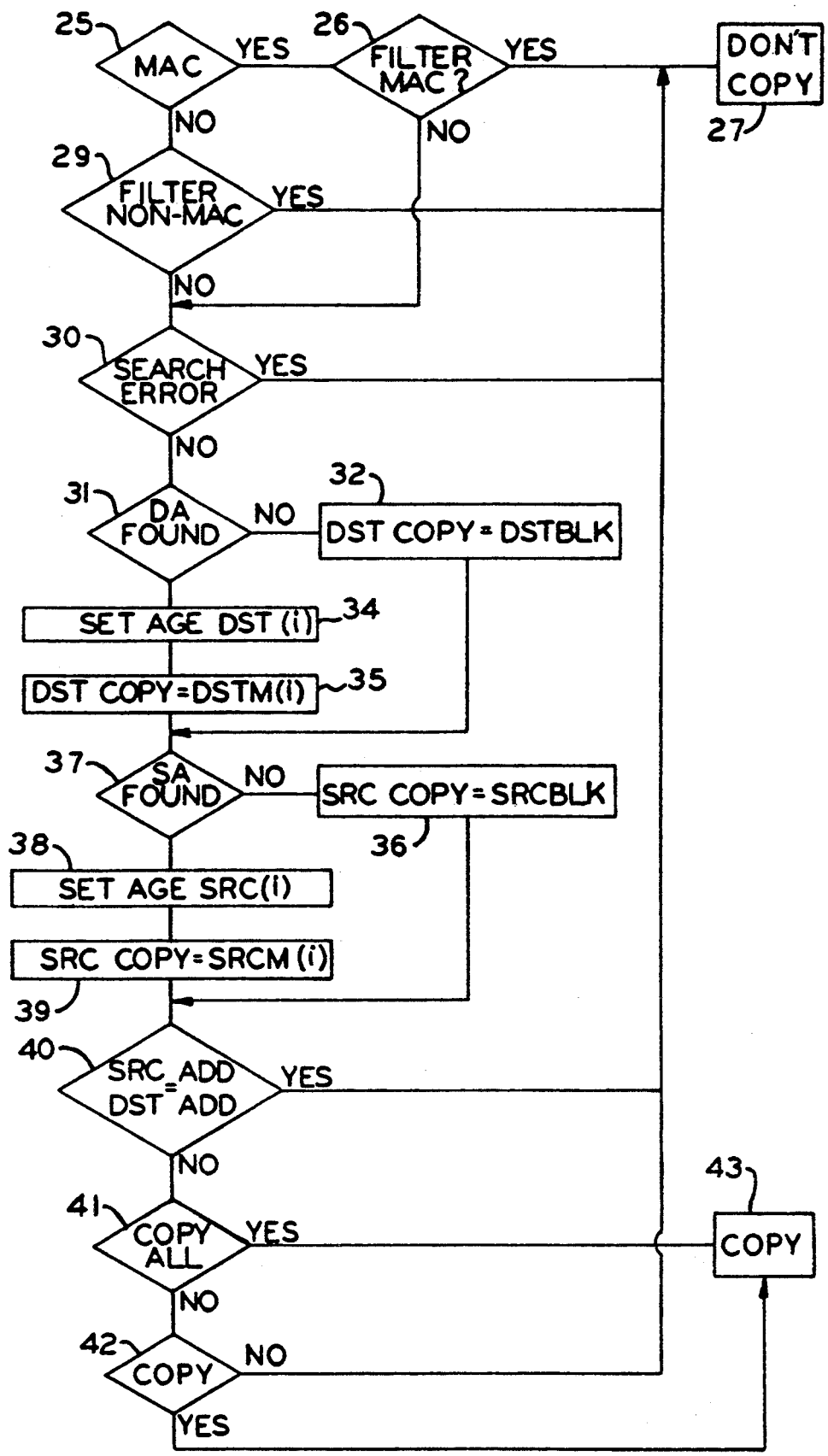
FIG. 3 illustrates the sequence of steps for the address filter in determining whether a frame should be copied from one LAN to another.

A more detailed description of the operation of the filter is shown in FIG. 3. This Figure illustrates the series of decisions which are made in order to determine whether or not the frame is to be copied. The address criteria shown in FIG. 3 is checked, and the decision to copy or not to copy is made, based on the various decisions set forth in FIG. 3. These individual decisions are posted following source address processing so that the address filter can make the ultimate copy or don't copy decision 27. The following steps comprising FIG. 3 are in order of precedence, the more important decisions being shown at the top of the Figure. Those decisions at the top of FIG. 3 result in a don't copy decision 27, and a copy decision is made by the later criteria identified in the decision making process of FIG. 3.

The process begins with detection by the filter of the frame type. In the event the filter is set to reject MAC frames on a token ring structure, the decision block 26 will result in the filter instructing the controller not to copy the frame.

For non-MAC frames, the process flows to decision block 29. If the filter is set to reject non-MAC frames, the frame is rejected for copying. On the other hand, if the decision, at step 29, is not to filter non-MAC frames, the logic proceeds to step 30. The search commences in step 30 for the destination address. The search error decision block 30 will indicate that an address processing error was determined, which renders any subsequent decisions made about the frame unreliable, and therefore a don't copy decision 27 will ultimately be made. Assuming that no errors were found, the processing of the frame to the next decision level leads to determining whether or not the destination address was found in the compare table. When the destination address is found in decision block 31, an aging bit is set in a reserved location containing the destination address in step 34. The source address of the frame is also searched for in the compare table in step 37. The location containing the address has a control field used to indicate whether the located address should be accepted or rejected on the basis of a MATCH decision. These control bits DSTM(i) and SRCM(i) will be used in step 41 to make a copy decision. Thus, if DSTM(i) is zero, the frame destination address was not found in the compare table and the frame should be copied.

The source address is similarly checked in decision block 37. When found, the source aging bit is set in the address location of the compare table containing the source address in step 38. The aging bits indicate to the processor that the address has been found to be a source on a receive frame. Control bits in this address location are read to indicate whether the source address MATCH decision should accept/reject, and a copy decision is stored in location SCRCM (i). Also, the bit will indicate that the source learning filter is to be engaged to learn a new address.

In step 40, the results of the comparison of the source address and destination address are tabulated. When the received source address equals the received destination address (a duplicate address frame), this corresponds to the situation wherein a source sent to itself a message which obviously need not be copied to the second LAN.

If a bit is set in the filter to copy all frames, then decision block 41 will be consulted and a copy decision is ultimately made in step 43, bypassing the filter function. In the event that only those frames having addresses meeting the foregoing criteria for destination and source addresses are to be copied, then decision block 42 will determine based on control bits DSTM (i) and SCRCM (i) whether the frame should be copied. These control bits determine the copy and reject decision. In the preferred embodiment of the invention, DSTM (1) would be set to indicate when a frame destination address was found in the compare table. This bit would then result in rejection of the frame.

FIG. 4 illustrates the source address learning feature of the invention. Source learning occurs only when the decisions represented in blocks 45, 47, 50, 52 and 55 are satisfied.

Decision block 45 determines that the source address has not been found in the compare table containing the most likely addresses, the address is checked in decision block 47 against a second table of addresses. The second table of addresses constitutes source addresses which are known to be foreign to the local area network to which the filter is connected. These source addresses are not to be learned in order to avoid overburdening the local area network controller whose addresses it will not process. A don't learn decision 46, 47 is posted under these circumstances.

Such prohibited addresses may be encountered when token ring frames copied from the second LAN are detected by the filter as being present on the first LAN. Since source addresses in these frames are not local to the first LAN, they should not be learned.

The determination in step 47 that the address is, in fact, to be learned, results in the address being placed into a vectored location within the RAM 11. In decision block 50, a determination is made as to whether the learned interrupts are enabled for operation. When these are enabled, indicating that the filter is to perform the learning function, the decision block 52 determines whether there are any other interrupts pending, as a result of a previous learned address awaiting action by the host processor. When they are not enabled NO interrupts are issued in step 51. These interrupts, when issued, result in the host processor being interrupted in step 53.

A decision block 55 is included to accommodate the Ethernet protocol. In Ethernet, collisions of frames can occur which will corrupt the source address being checked with the filter. In order to avoid processing and learning a corrupt address, step 55 will provide a time period sufficient to verify that a valid Ethernet frame has been received before issuing an interrupt to the processor that a new address to be learned has been vectored into a memory location. If, after the time period which in the preferred embodiment is 64 bytes, the frame is not detected, NO interrupt is issued in step 56.

In step 53, an interrupt will be generated immediately for learning the address for the pending as well as the new request. In the event that no interrupts are pending, the interrupt is issued for the only address to be learned. In step 54, the host processor will recognize the interrupt for learning the address.

Figures 5A, 5B:
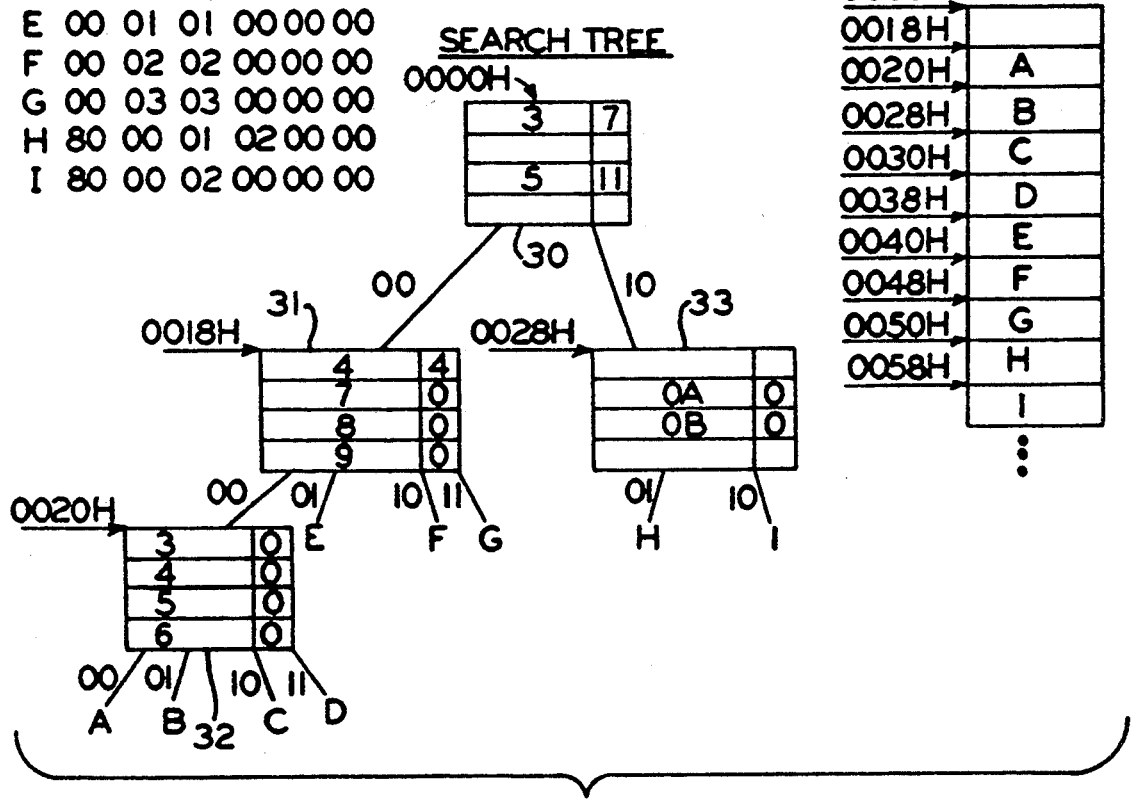
FIGS. 5A and 5B are an illustration of the search tree and compare table organization in random access memory 11, 12.

Prior to discussing the hardware which is necessary to perform the foregoing functions, the search process for recognizing destination and source addresses will be discussed with respect to FIG. 5A and 5B.

In accordance with the invention, a novel address verification scheme employs a search tree used to compress the time it takes to verify an address. The compression results from checking only bit pairs which are capable of distinguishing the address from entries in the table of addresses. The significant bits traverse a search tree to identify the most likely corresponding address appearing in the table of addresses. Referring to FIG. 5A, a search tree is shown which comprises search nodes representing a subset of memory locations in the RAM 11, 12. Each search node is addressed by a pair of bits of an address.

At the start of a search, the first of these nodes, a root node, is always addressed by the first pair of address bits.

The addressed location contains a pointer and a skip count identifying the next pair of address bits to address a subsequent search node. The subsequent search node is identified by the pointer.

The process continues as the next pair of bits identified by a skip count in the root node is used to address the search node identified by the pointer obtained from the root node. The second linked node also contains a skip count identifying a subsequent pair of address bits as well as a pointer to a subsequent search tree node to be addressed by the pair of bits identified by the skip count.

The search progresses until a skip count equal to zero (constituting a term node) is encountered in the search tree. The pointer associated with a term node points to the location in the compare table containing the most likely address corresponding to the 48 bit address being verified.

At this point in the address verification process, the compare mode is entered. During the compare mode phase, the most likely address is compared with the entire 48 bit address. This single key comparison will result in the address either being verified or not. The process is illustrated in FIG. 5B.

A simple example of a search which distinguishes among three keys is discussed below. These keys can be selected as

```
1 1 1 0 1 0 0 0    A
1 1 1 0 0 0 1 0    B
1 1, 1 0, 1 1, 0 1    C.
```

Examining the two quantities, it is clear that it is the 5th bit position (left to right) which contains the first difference among these addresses. Thus, only bit position 5 need be consulted to discriminate between A and B. Using bit positions 5 and 6 allows discrimination among A, B and C. The root node is addressed by the first two bits 11. This node points to a second node with a skip count of 3, identifying bits 5 and 6 as the next set of bits to check.

When bits 5 and 6 are used to address the second search node, they will encounter a term node and the pointers will point to compare table locations A, B and C. The ability to traverse the tree with only the bits needed to distinguish one key from the remaining keys compresses the time needed to locate the key in the compare table. The entry in the compare table which has been located by the search tree can then be compared to the key which traversed the search tree.

The foregoing process is repeated for the source address. Depending on the result of the search process, the source address is either verified or not.

The search tree and compare tables can be updated by the host processor. When new addresses are to be entered into the system, the host processor can identify the location in the compare table for placing the new address. The search tree is updated by first processing the new address through the search trees to determine whether or not a term node is ever encountered. If a term node is encountered, then this address is the closest to the address being inserted in the compare table. The two addresses are compared, i.e., the one already in the table and the one to be inserted, and the first bit position counting from the left at which they differ is noted. The search tree is traversed again through the same path, and the skip counts are added together. When the sum of the skip count equals or exceeds the differing bit position noted, then this is the location where a new search node should be inserted. The new node has a pointer which points to the compare table where the new 48 bit address will be inserted. The skip counts in the new internal node and the node after which it was inserted are adjusted and the new node is pointed to by the old term node.

Thus, the search tree can be updated by merely noting the closest address to the one being inserted, and inserting a new search tree node which will identify a skip count distinguishing the new address from the old closest address. This skip count will then identify a term node for the newest address in the table.

FIG. 6 illustrates the partition of RAM 15, 16 into search nodes and compare nodes. The search nodes are shown as having a skip count and pointer value at each of four locations, identified by pair of bits 00, 01, 10 and 11.

The compare node comprises a table organized to include three fields for each address. These fields include a 48 bit compare address, as well as a control field CMD and a status field STATUS. The CMD control field identifies the ACCEPT/REJECT criteria for the address which has been found in the table of addresses. If SCRM is equal to 1 or DSTM is equal to 1, the matching source or destination address was found in the compare table. As described with respect to FIG. 3, these bits control the ACCEPT/REJECT decision.

The status field includes an SCRM and DSTM aging flag. These aging flags are set every time the appropriate source/destination address is encountered in the search process. In this way, the host processor can keep track of dormant addresses and purge them from the compare table to make room for other more active addresses.

Thus, the basic search feature has been described for checking addresses that are contained in frames being filtered for copying from one LAN to another. Two other checks which are done in accordance with the preferred embodiment are a check to make sure that a destination address and source address are not the same for the same frame, indicating a source is trying to send a message to itself. Further, in the event a source address is not found in the routine for verifying addresses, a second table within the RAM 15, 16 is consulted which contains ineligible addresses for learning. Once the ineligible address table has been consulted, a source address is either ready for learning or discarded as ineligible for learning.

Referring now to FIG. 7, an overall block diagram of the filter and its interface with respect to the RAM 15 is shown. The filter itself comprises a programmable logic device such as the Xilinx programmable cell for carrying out the foregoing functions. The filter 11 is connected by a data bus 61 with the RAM 15, as well as the host processor 14. Similarly, an address bus 62 is shared to permit either the filter or processor to access the RAM 15.

Isolation buffers 63 and 64 will inhibit connection of the respective buses 61 and 62 to the processor when the filter senses that data is to be received from the node controller 7. The embodiment shown in FIG. 7 is capable of receiving a frame of data from either a token ring LAN or an Ethernet LAN. Clock signal RCLK is synchronous with the token ring data rate being processed by the token ring controller. The NRX and DA line is the beginning of the frame signal for the token ring frame. The filter, as soon as it detects the NRX will address the root node of the search tree in the RAM 15. When a busy line is asserted by the filter, the host processor cannot read or write to or from the RAM 15 during processing of frame addresses. The status and control chip select line is driven by the controller. CRSIN and CDIN are the protocol signals which identify the beginning of a frame to be copied in the Ethernet model. An RII bit detection scheme is provided for those frames in a token ring protocol which may contain routing information. Any such frames are processed by a different special controller when the current filter is not engaged during the processing of such frames. When the RII bit is set, it will signal the source routing controller to take over the frame and otherwise process it. The BLE bit is used when the filter addresses one of the devices in a WRITE mode. BLE will avoid enabling the other RAM devices when only one is to be written to by performing a MAD/MODIFY/WRITE cycle.

An interrupt request line is provided by the filter for posting a search fault and doing source learning and when an address has been vectored to the location in RAM 15 for new source addresses to be learned. The copy logic signals are shown for enabling the node controller of the first LAN. The LAN will enter a handshake communication with the host processor 14 to transfer the data being inserted in the buffer memory 13 of FIG. 1 to the second LAN or to ignore it.

A search fault occurs when an entire frame has been collected and the search has not terminated as it should. This error check generates an interrupt indicating that the process is in error, and the results should be discarded. At this time, the generated interrupt to the host processor will indicate the frame is to be rejected. As was shown in FIG. 3, this results in a no copy decision being made for the frame being received.

The process of verifying addresses received in the frame is carried out in the filter 11 by two logic circuits configured from the programmable logic device. These two devices are illustrated in FIGS. 8 and 9. FIG. 8 is the RAM control logic which will provide for addressing of the filter RAM 15 during address verification. The byte shift registers of FIG. 9 provide for the buffering of the frame addresses being received until the addresses have been verified.

The byte shift registers are shown generically in FIG. 8 as 68, and will be explained in detail with respect to FIG. 9.

The logic shown in FIG. 8 will provide for the addressing of the search and compare nodes during the address filtering. The address lines of RAM 15 are connected to an address translator 70 and to shift counter logic circuit 79. At the beginning of a search phase, the byte shift register 68 will present the first two bits of the destination address to the shift counter logic 79 while transparent latch 74 stores the frame data received from the controller on the first LAN node.

During the search phase, byte shift register 68 will clock out pairs of address data bits to the shifter counter logic 79. The root node entry is addressed by the first two bits from the byte shift register 68 which correspond to the first two bits of destination address, applied via the shift counter logic 79 to the A0, A1 bit address lines of the RAM 15. The root node entry location will produce the pointer from the root node which is loaded from the output of the filter RAM 15 to the address translator 70. The skip count derived from the root node will be inserted in skip counter 71 as a preset value. Skip counter 71 counts up at half the bit rate of the incoming frame, up to count $F_{Hex}$ i.e., 16. When the skip counter 71 reaches $F_{Hex}$, the next pair of address bits are identified for addressing the next linked search node. The skip counter 71 will then enable the shift counter logic 79 to apply the next pair of bits shifted in time from the byte shift register 68 to the A1, A0 address lines. A2 through A13 contain the pointer of the route node which is the address for the next linked search node.

The process continues until a term node is encountered having a zero skip count. The zero skip count loaded in skip counter 71 indicates a term node. The search process waits until all 48 bits are accumulated in the byte shift register 68. At this time, the page select bit A14 is set, causing the address translator 70 to point with the term node pointer to an entry in the compare node in RAM 15.

The compare logic 72 compares the entire 48 bit address stored in the byte shift register 68 with the compare table entry retrieved from the RAM 15. The comparison occurs in 16 bit segments of the total address. For this purpose, the shift register 68 will shift the entire 48 bit address, 16 bit segments at a time, while the RAM control logic 76 retrieves 16 bits at a time into the compare logic, such that each segment retrieved can be compared with the current segment being shifted by the byte shift register. The phases of the compare cycle produce bits indicating whether the comparison for the particular segment has been made or not. The accumulation of three compare bits identifies an address as being found in the table.

Shown also in FIG. 8 is the RAM control for controlling the RAM filter 15 during the learn phase. As was noted, addresses not found can be learned, and in the process, they are written to RAM 15 if a second compare with a list of prohibited addresses fails to find a match. The vectored location for the address to be learned is provided by the RAM control 76 to the driver 78 for addressing RAM 15.

FIG. 9 illustrates the byte shift registers 68 in greater detail. Transparent latch 80 receives from the controller the frame being received over the local area network. The transparent latch being empty at the beginning of receipt of the frame, will transfer 8 bits to shift register 81 and 8 bits to shift register 82. The bits are shifted through the registers in synchronism via a closed loop. The first two bits which address the search nodes are taken from lines Tmsd 9 and Tmsd 8 of the first shift register. After 8 bits of clocking the shift registers 81 and 82, the first half of the 16 bit segment is present in shift register 82. The 8 bits of register 82 are loaded into the byte shift register 85. The process continues when the second half of the first segment of 16 bits reach shift register 82. This half of the 16 bit segment is also loaded into the byte shift register 85.

The process continues until all 48 bits have been shifted to shift registers 82, and 86 through 91.

Having loaded the entire 48 bit address into the byte shift register 85, the compare phase may commence. The compare phase is effected by shifting 8 bits at a time from register 91, back to the 8 bit add comparator 84 and the register 86. After two compare phase clock cycles 16 bits have been transferred from register 91 back to the top of byte shift register 86.

The two clock periods which permit 16 bits of address data to be transferred to the compare logic 72 is also the time interval required to access 16 bits of compare table data from the RAM 15. Thus, the compare logic 72 following the two clock periods is ready to provide a comparison of the segments of address data. The process continues for the remaining two 16 bit segments, shifted out 8 bits at a time from the byte shift register 85 compared as 16 bit segments with 16 bit segments retrieved from RAM 15. The byte shift register 68 includes a 16 bit add comparator 92 to provide the required comparison and produce three bits of information to the compare logic 72. The three bits of information indicate all segments in the address have been checked with respect to the compare table entry, the compare logic produces a copy/no copy result.

As the address filtering is done in real time, when the byte shift register 85 processes the destination address, source address bits may begin to be accumulated in the transparent latch 80. In this way, no address information is lost while the decision-making process is in progress for verifying the destination address.

Source address processing by the byte shift register 85 and input shift registers 81 and 82 proceeds as the destination address was processed. However, in order to enter the source learning phase, the byte shift register 85 will continue to circulate the source address in a closed loop such that it may be compared with the prohibited list of addresses contained within RAM 15. The 16 bit comparator 92 will provide the three bits of information, indicating whether or not the address has been found among the prohibited list of addresses. When a decision is made to learn the address, it is available from lines FB0–FB15 The RAM control logic writes the first 16 bits of data $FB_0$–$FB_{15}$ to the vectored location. The byte shift register 85 must shift a total of 16 bits before the next WRITE, indicating the next full segment is available for writing to the vectored location in RAM 15.

Figure 10:
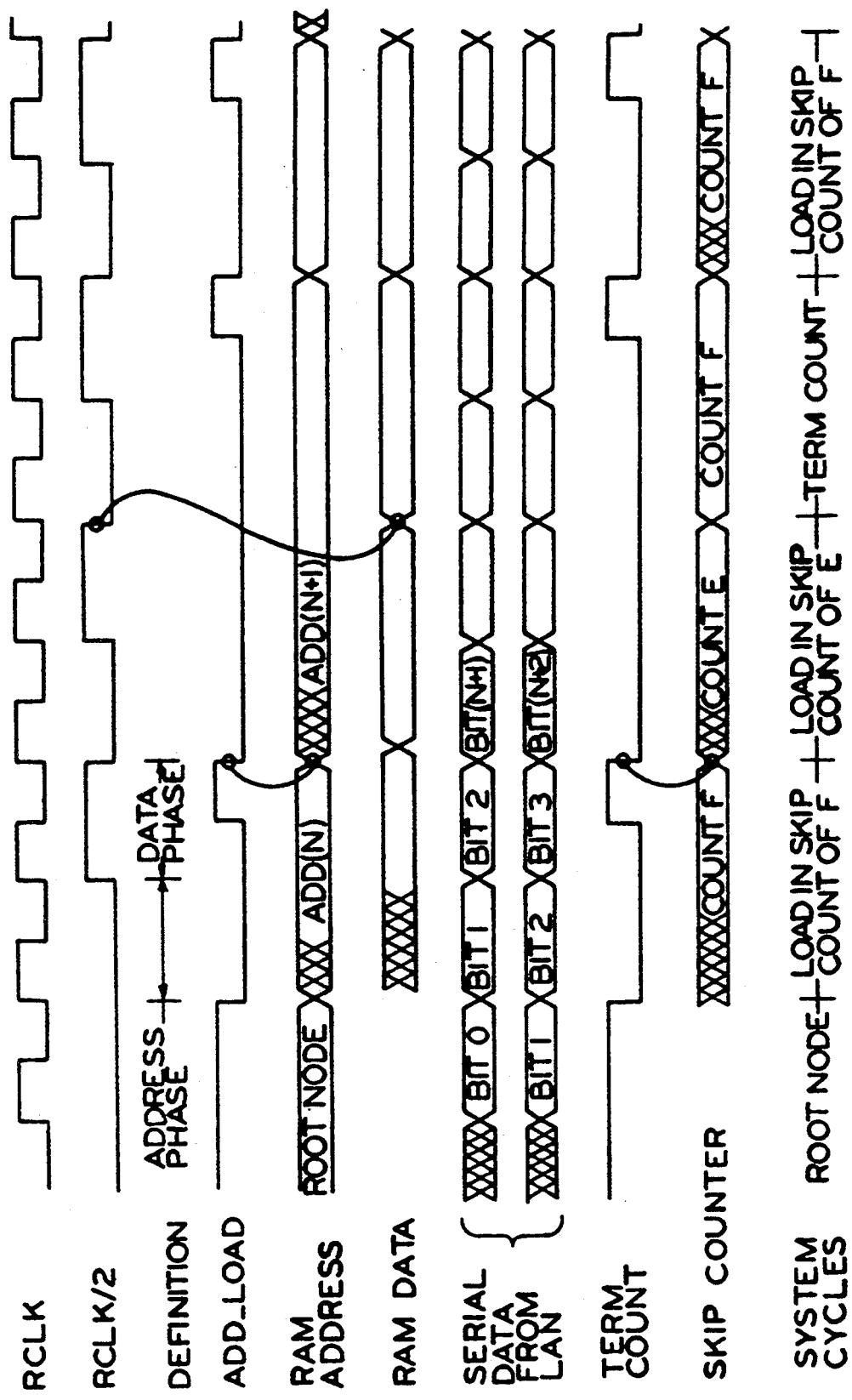
FIG. 10 is a timing diagram illustrating the operation of the RAM control logic of FIG. 8 during a search phase.

The operation of the RAM control logic of FIG. 8 is illustrated in the timing diagram of FIG. 10. FIG. 10 shows there are two clock signals, RCLK and RCLK/2. RAM 15 is addressed by bit 0 and bit 1 from the serial data of the frame being received from the local area network. The retrieval of the root node occurs in two phases, an address phase and data phase, defined by RCLK/2. During the selection of the entry in the root node, the RAM data is produced during the data phase which includes the pointer and skip count.

The pointer is loaded in the address translator 70 while the skip counter 71 receives in the example shown a count of F. The skip counter 71 is configured to count up to F. Thus, a count of F loaded in the skip counter will result in a terminal count which occurs at the next bit pairs, i.e., bits 2 and 3.

Bits 2 and 3 are thereafter used to locate the entry in the second node which was addressed by the pointer retrieved from the root node. The count E is retrieved as a skip count and loaded in the skip counter 71. At the time the skip counter 71 counts up to the count F, another term count, i.e., skip counter 71, has identified the pair of bits to be checked. This pair of bits once again selects an entry of a further node identified by the previous search node pointer.

Following completion of the search phase, the compare phase is entered, as is shown in FIG. 11. The compare phase is carried out by the byte shift registers of FIG. 9. The same two clock signals RCLK and RCLK/2 are shown. Once bits 46 and 47 have been received by the filter, indicating an entire address has been accumulated in the byte shift register 85, the compare table node address is loaded. The compare table node address indicates the beginning memory location containing all the compare addresses.

At this time, the byte shift command is given to the byte shift register 85 and 16 bit segments of the address are shifted through lines FB0 through FB15. RAM 15 is then read and a compare of each of the 16 bit words which is read from the RAM 15 with respect to the segments being read from the byte shift register 85 is made. As can be seen, count 0, count 1 and count 2 represent three segments of address bits being read from the RAM. These occur during the byte shift and in synchronism therewith, such that three separate determinations can be made as to the presence or absence of each segment. The RAM lower order bits A0 and A1 are toggled once the pointer has been loaded, pointing to the remaining segments of the compare table entry in RAM 15.

Referring to FIG. 6, count 0 represents 16 bits identified in location 0, count 1 in 1 and count 2 in 2. The pointer will point initially to the address for count 0 and the RAM address will be incremented for count 1 and count 2 to obtain the remaining two segments of the 48 bit compare table entry.

As can be seen, following the compare cycle, a determination is made whether or not the compare has been made. The aging bits of FIG. 6 are set in an aging cycle by enabling the WRITE line and addressing the RAM at the end of count 3.

Following the compare cycle, the page bit is reset and the vectored location of the root node is selected to start the next search phase of a source or destination address being processed.

Thus, it can be seen that the present invention can be implemented in a programmable device to verify both destination and source addresses. Addresses which are not found in the table can also be learned and inserted in the table by an on-board host processor. Suitable changes to the search tree can also be implemented to accommodate the newly-added addresses.

While the present invention has been described with particular reference to token ring architecture, it is clear that the principles can be applied to other protocols which require a transparent bridge and filtering of addresses in the frames being forwarded by the bridges.

What is claimed is:

1. An Address filter for an adaptive transparent bridge connecting a first local area network to a second local area network, whereby data frames including source addresses and destination addresses may be transferred from one of said local area networks to the other, said address filter comprising:

a memory partitioned into search tree nodes and a compare node, said compare node containing addresses which are known to belong to stations connected to said first local area network, said search tree nodes being formed into a plurality of links, each node including pointer data pointing to a subsequent node or to a location in said compare node and including a skip count identifying a pair of address bits;

means for addressing said linked node with pairs of bits of an address being filtered, the first of said pairs of bits identifying a first of said linked search tree nodes to obtain a skip count identifying a subsequent pair of address bits, as well as the identity of a subsequent pair of address bits, as well as the identity of a subsequently linked node to be addressed by said subsequent pair of address bits, said means addressing additional search tree nodes with additional pairs of address bits identified by a skip count of a previously addressed search node until a location in said compare node is obtained; and, means for comparing said address contained in said compare node with said address being filtered, whereby the presence or absence of said address being filtered on said first local area network is determined.

2. The address filter of claim 1 wherein said compare node includes control data identifying whether said address being filtered is a valid destination or source address.

3. The address filter of claim 2 wherein said control data includes a memory location which is written with an aging bit each time said means for comparing produces an indication that an address being filtered matches an address in said compare node.

4. The address filter of claim 3 wherein said control data includes separate bit locations to be written with an aging bit to identify whether a destination or source address has been identified.

5. The address filter of claim 1 wherein said skip counts are selected for each search tree node so that a minimum number of search tree nodes are addressed to obtain the location of an address in said compare node.

6. The address filter of claim 1 further comprising a source learning filter for reporting a new source address contained in said frame which is not found in said compare node.

7. The address filter of claim 6 wherein said source learning filter comprises:

a table of source addresses known to be foreign to the said first local area network;

a comparator means for comparing each address in said table of source addresses with each source address that is not found in said compare node; and, means for storing said source address in said compare node.

8. An address filter for filtering frames which are to be copied from one local area network to another local area network at a frame bit rate, comprising:

a random access memory partitioned into a storage area containing linked search nodes and into an area containing a compare table of likely addresses associated with said one local area network, each search node including a subset of memory locations which are addressable by a pair of address bits, each addressable location including a skip count identifying a pair of address bits and a pointer pointing to another search node, the last of said linked search nodes including a pointer pointing to a location in said compare table containing one of said likely addresses;

an address translator for addressing said memory with said pointers read from said memory;

a skip counter which is located with skip counts read from said memory, said skip counter being synchronized with said frame bit rate so that said counter is decremented in synchronism with said address bits;

a shift register for receiving said address bits and shifting said bits in synchronism with said skip counter;

means for addressing said subset of said search nodes with pairs of said frame address bits identified by said skip counter when it counts down to a terminal count, whereby each search node is identified and each pointer of each search node provides a pointer to another search node until a compare table location is obtained; and, means for comparing said frame address with an address obtained from said compare table location to determine whether said frame address is related to said one local area network.

9. A network bridge for copying electronic data frames from one local area network to another local area network, comprising:

a controller connected to a first local area network to receive from said first network a frame of data including a destination address and a source address;

an address filter connected to said controller to detect said addresses comprising:

search logic means for examining said addresses, said logic means providing bit position information identifying groups of address bits, and pointer data for searching through a search tree, along a path identified by the value of each successive group of said address bits until a term node is reached;

means for comparing the destination address with an address identified by the term node, whereby the presence or absence of the destination address on said first network is verified; and, said controller connected to a second local area network for copying said frame to said second network when said first network is determined not to contain said destination address.

10. The network bridge of claim 9 wherein said search logic means includes a random access memory containing a plurality of subsets of memory locations comprising search nodes, each memory location containing a pointer identifying a subsequent search node, and a skip count identifying a group of address bits for addressing said subsequent search node, said term node comprising a search node with a skip count equal to zero, and a pointer which identifies a compare value in a compare table.

* * * * *